United States Patent
Ding et al.

(10) Patent No.: US 9,992,145 B2
(45) Date of Patent: Jun. 5, 2018

(54) EMAIL THREADS RELATED TO MESSAGING CONTENT

(71) Applicant: International Business Machines Corporation, Armonk, NY (US)

(72) Inventors: Tao Ding, Xi'An (CN); Xue Feng Gao, Beijing (CN); Ying Wei, Xi'An (CN); Qing Yu, Beijing (CN); Rui Hua Zhu, Xi'An (CN)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 15/073,701

(22) Filed: Mar. 18, 2016

(65) Prior Publication Data

US 2017/0272394 A1    Sep. 21, 2017

(51) Int. Cl.
 *H04L 12/58*    (2006.01)
 *H04L 12/26*    (2006.01)

(52) U.S. Cl.
 CPC ............ *H04L 51/16* (2013.01); *H04L 43/045* (2013.01); *H04L 51/04* (2013.01); *H04L 51/08* (2013.01); *H04L 51/12* (2013.01); *H04L 51/32* (2013.01)

(58) Field of Classification Search
 CPC ......... G06F 17/30389; G06F 17/30634; G06F 17/30864; G06F 17/30867; G06F 17/30905; G06Q 10/1095; H01L 27/1463; H04L 51/06; H04L 51/12; H04L 51/32; H04L 67/02; H04L 43/045; H04L 51/16; H04L 51/08; H04L 51/04; H04N 7/173; H04W 4/206
 See application file for complete search history.

(56) References Cited

U.S. PATENT DOCUMENTS 7,933,957 B2    4/2011 Daniell
8,250,154 B2    8/2012 Limberg
(Continued)

FOREIGN PATENT DOCUMENTS

WO    2016153735 A1    9/2016

OTHER PUBLICATIONS

Ding et al., "Email Threads Related to Messaging Content", USPTO U.S. Appl. No. 15/660,056, filed Jul. 26, 2017, 40 pages.
(Continued)

*Primary Examiner* — Le H Luu
(74) *Attorney, Agent, or Firm* — Christopher McLane

(57) ABSTRACT

A computer identifies a first participant and a one or more additional participants associated with a collaboration through an electronic communication application that includes messaging content, identifies a first set of one or more keywords within the messaging content between the first participant and the one or more additional participants, retrieves a first set of historical information based at least in part on the first set of one or more keywords, the first participant and the one or more additional participants, generates a first instance of historical results that includes a multi-dimensional cube that graphs the first set of historical information with respect to the first set of one or more keywords, the first participant and the one or more additional participants, and a time frame, and provides the first instance of historical results to the first participant.

20 Claims, 5 Drawing Sheets

(56) References Cited

U.S. PATENT DOCUMENTS

| | | | |
|---|---|---|---|
| 8,281,372 B1* | 10/2012 | Vidal | H04L 51/12 709/206 |
| 8,694,586 B2 | 4/2014 | Yang et al. | |
| 8,806,084 B2 | 8/2014 | Taylor et al. | |
| 8,909,715 B2 | 12/2014 | Chinnam et al. | |
| 8,978,039 B2 | 3/2015 | Sutedja et al. | |
| 9,015,244 B2 | 4/2015 | Mandel et al. | |
| 2004/0153456 A1* | 8/2004 | Charnock | G06F 17/30389 |
| 2004/0158609 A1 | 8/2004 | Daniell et al. | |
| 2006/0072721 A1* | 4/2006 | Wisniewski | G06F 17/30905 379/88.22 |
| 2006/0271630 A1 | 11/2006 | Bensky et al. | |
| 2010/0153453 A1* | 6/2010 | Knowles | G06F 17/30867 707/784 |
| 2011/0276993 A1* | 11/2011 | Ferguson | H04N 7/173 725/30 |
| 2012/0191716 A1* | 7/2012 | Omoigui | H01L 27/1463 707/740 |
| 2012/0209871 A1 | 8/2012 | Lai et al. | |
| 2013/0031183 A1* | 1/2013 | Kumar | H04L 51/06 709/206 |
| 2014/0143234 A1 | 5/2014 | Scherpa | |
| 2015/0370861 A1* | 12/2015 | White | G06F 17/30634 707/723 |
| 2016/0063016 A1* | 3/2016 | Eggleston | G06F 17/30864 707/706 |
| 2016/0080485 A1* | 3/2016 | Hamedi | H04L 67/02 709/204 |
| 2016/0142889 A1* | 5/2016 | O'Connor | H04W 4/206 705/44 |
| 2016/0191450 A1* | 6/2016 | Lineberger | H04L 51/32 709/206 |
| 2017/0039527 A1* | 2/2017 | Rangan | G06Q 10/1095 |
| 2017/0193051 A1 | 7/2017 | Ghafourifar et al. | |

OTHER PUBLICATIONS

Appendix P, List of IBM Patents or Patent Applications Treated As Related, 2 pages, dated Jul. 28, 2017.

Flark, Stuart, "Skype in eDiscovery", 7Safe, Forensic Focus for Digital Forensics and Ediscovery Rofessionals, E-Discovery, Forensics 101, Posted by hwoodruffi, Nov. 9, 2011, 4 pages, <http://articles.forensicfocus.com/2011/11/09/skype-in-ediscovery/.

* cited by examiner

US 9,992,145 B2

EMAIL THREADS RELATED TO MESSAGING CONTENT

BACKGROUND

The present invention relates generally to the field of communication software, and more particularly to correlating instant messaging conversations to e-mail communications.

Communication software provides remote access to systems and exchange files and messages in text, audio and/or video formats between different computers and/or users. Communication software includes application programs, operating system components, and firmware that form part of a communication system. Typical application programs associated with a communication software include a web browser, mail user agent (MUA), chat, and instant messaging.

An email client, email reader or a mail user agent (MUA) is a computer program used to access and manage email of a user. E-mail allows the exchange of digital messages across the Internet or other computer networks via the server facility of an e-mail provider from an author to one or more recipients. An e-mail thread is an e-mail message that includes a running list of all the succeeding replies station with the original message. When sending an e-mail, the MUA formats the message and uses the submission protocol, to send the message to the local mail submission agent (MSA) that in turn determines the destination address provided in the SMTP protocol and the e-mail address of the recipient. The MSA resolves the domain name to determine the domain name system (DNS), which specifies a mail server responsible for accepting e-mail messages on behalf of the domain of the recipient such as a message transfer agent (MTA). The e-mail passes to the message delivery agent (MDA) which delivers the e-mail to the e-mail box (e.g., mailbox) which stores the e-mail. Once in the e-mail box, the e-mail is available to the user when the user is online. While online, the user can view, organize, and respond to e-mails based on fields and information within the message header (e.g., sender, recipients, subject, time and date of the e-mail, and the message size) and content within the message body.

Instant messaging (IM) programs are a type of online chat that offers real-time text transmission over the Internet between two or more participants. Instant messaging programs facilitate connections between specified known users using a contact list (e.g., buddy list, friend list, contacts, etc.). In general the instant messaging program connects to the server utilizing a proprietary protocol for communication when the user is online (e.g., active, logged in, etc.) The instant messaging program sends the server the assigned connection information, an internet protocol (IP) address and port number associated with the computing device, and the contact list. The server determines connection information (e.g., IP address and port number) for individuals within the contact list and identifies an associated status (e.g., online, offline, etc.). A user of the instant messaging program is then able to initiate a message by selecting an online recipient, typing the message, and selecting send. The instant messaging program directly sends the message to the IP address and port number of the recipient and then sends and receives messages directly between the participants. The instant messaging program maintains a history of the messages (e.g., conversation) that can be reviewed during or after the conversation messaging conversation ends, as the instant messaging program stores the messages in a local message history, similarly to e-mails.

SUMMARY

Aspects of the present invention disclose a method, computer program product, and system for providing historical results related to a collaboration. The method includes one or more computer processors identifying a first participant and a one or more additional participants associated with a collaboration through an electronic communication application that includes messaging content. The method further includes one or more computer processors identifying a first set of one or more keywords within the messaging content between the first participant and the one or more additional participants. The method further includes one or more computer processors retrieving a first set of historical information based at least in part on the first set of one or more keywords, the first participant and the one or more additional participants, wherein the first set of historical information includes at least one of the following: e-mail files and messaging history. The method further includes one or more computer processors generating a first instance of historical results that includes a multi-dimensional cube that graphs the first set of historical information with respect to the first set of one or more keywords, the first participant and the one or more additional participants, and a time frame. The method further includes one or more computer processors providing the first instance of historical results to the first participant.

DETAILED DESCRIPTION

Embodiments of the present invention recognize while communicating via methods of electronic communication such as e-mail correspondences and instant messaging conversations, prior instances of the instant messaging conversations and the e-mail correspondences may be relevant to a current discussion topic. Embodiments of the present invention recognize individuals may experience difficulty recalling details of the prior instances of e-mail correspondences and/or instant messaging conversations that pertain to the current discussion topic. Additionally, embodiments of the present invention recognize that locating the actual prior instances of e-mail correspondences and/or instant messaging conversations within an e-mail box and associated folders and/or history files that pertain to the current discussion topic may be difficult and/or time consuming. Embodiments of the present invention correlate keywords and participants of an instant messaging conversation with e-mail correspondences (e.g., e-mail threads) and prior instant messaging conversations (e.g., history), over time. Embodiments of the present invention utilize the correlations to provide relevant prior instances of e-mail correspondences and instant messaging conversations to the individual to utilize with respect to the current discussion topic. Additional embodiments of the present invention incorporate training to further organize and refine a set of prior instances of e-mail correspondences and/or instant messaging conversations to the individual for reference (e.g., provide a tailored and/or reduced set of data within the initially provided references). Embodiments of the present invention dynamically adjust the correlations according to changes in the keywords within the collaborative communication environments, and provide updates and/or new instances of e-mail correspondences and instant messaging conversations in response to detecting a new discussion topic.

Figure 1:
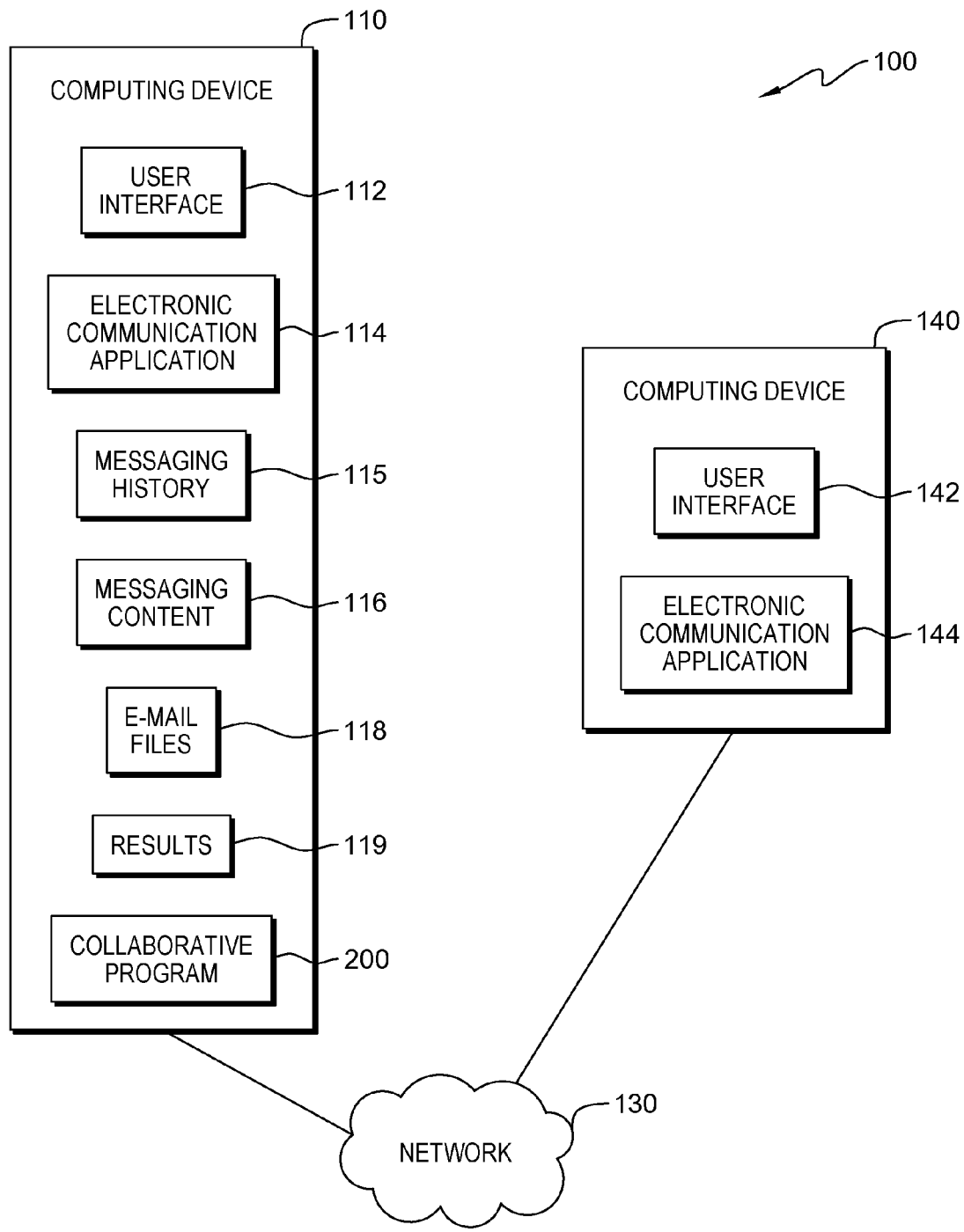
FIG. 1 is a functional block diagram illustrating an electronic communications environment, in accordance with an embodiment of the present invention.

The present invention will now be described in detail with reference to the Figures. FIG. 1 is a functional block diagram illustrating an electronic communications environment, generally designated 100, in accordance with one embodiment of the present invention. FIG. 1 provides only an illustration of one embodiment and does not imply any limitations with regard to the environments in which different embodiments may be implemented.

In the depicted embodiment, electronic communications environment 100 includes computing device 110 and computing device 140, interconnected over network 130. Electronic communications environment 100 may include additional computing devices, mobile computing devices, servers, computers, storage devices, or other devices not shown.

Computing device 110 and computing device 140 may be any electronic device or computing system capable of processing program instructions and receiving and sending data. In some embodiments, computing devices 110 and 140 may be a laptop computer, a tablet computer, a netbook computer, a personal computer (PC), a desktop computer, a personal digital assistant (PDA), a smart phone, or any programmable electronic device capable of communicating with network 130. In other embodiments, computing devices 110 and 140 may represent a server computing system utilizing multiple computers as a server system, such as in a cloud computing environment. In general, computing device 110 and 140 are representative of any electronic device or combination of electronic devices capable of executing machine readable program instructions as described in greater detail with regard to FIG. 5, in accordance with embodiments of the present invention. Computing device 110 contains user interface 112, electronic communication application 114, messaging history 115, messaging content 116, e-mail files 118, results 119, and collaborative program 200 as depicted and described in further detail with respect to FIG. 5. Computing device 140 contains user interface 142 and electronic communication application 144.

User interfaces 112 and 142 are programs that provide an interface between a user and computing device 110 and a user and computing device 140 respectively, and a plurality of applications that reside on computing devices 110 and 140 (e.g., electronic communication application 114, electronic communication application 144). Additionally, user interfaces 112 (e.g., user interface 142) provide an interface between a user of computing device 110 (e.g., computing device 140) and a plurality of applications that reside and/or may be accessed over network 130 (e.g., connected to a server or computing device not shown). A user interface, such as user interfaces 112 and 142, refer to the information (e.g., graphic, text, sound) that a program presents to a user and the control sequences the user employs to control the program. A variety of types of user interfaces exist. In one embodiment, user interfaces 112 and 142 are graphical user interfaces. A graphical user interface (GUI) is a type of interface that allows users to interact with peripheral devices (i.e., external computer hardware that provides input and output for a computing device, such as a keyboard and mouse) through graphical icons and visual indicators as opposed to text-based interfaces, typed command labels, or text navigation. The actions in GUIs are often performed through direct manipulation of the graphical elements. User interface 112 sends and receives information through electronic communication application 114 to and from electronic communication application 144 and collaborative program 200. User interface 142 sends and receives information through electronic communication application 144 to and from electronic communication application 114.

Electronic communication applications 114 and 144 are instances of communication software that provide remote access to systems and exchange files and messages in text, audio, and/or video formats between different computing devices (e.g., computing device 110 and computing device 140) and users. In one embodiment, electronic communication applications 114 and 144 include an e-mail client that exchanges digital messages (i.e., e-mail) between an author and one or more recipients. In another embodiment, electronic communication applications 114 and 144 also include instant messaging applications that are a type of online chat, which offers at least real-time text transmission over the Internet. In another embodiment, electronic communication applications 114 and 144 are applications that provide video chat and/or voice call services (e.g., teleconferences, video conferencing software, etc.). The participants are able to exchange messaging content 116 in the form of digital documents (e.g., images, text, video, etc.) and communicate via text and video messages through video conference calls. In another embodiment, electronic communication applications 114 and 144 include one or more of the aforementioned applications (e.g., e-mail, instant messaging, and/or audio and/or video conferencing). In one embodiment, electronic communication applications 114 and 144 include separate communication software for e-mail and instant message applications. In another embodiment, electronic communication applications 114 and 144 include communication software that includes both the e-mail client and instant messaging software (e.g., instant messaging application is an embedded function within the e-mail client). In some other embodiment, electronic communication applications 114 and 144 include additional methods known by one skilled in the art for conducting electronic communications.

In the depicted embodiment, electronic communication application 114 and electronic communication application 144 reside on computing device 110 and computing device 140 respectively. In another embodiment, electronic communication application 114 and electronic communication application 144 may reside on a server or on another device (not shown) connected over network 130. Electronic communication application 114 sends and receives information to and from electronic communication application 144 and collaborative program 200. Electronic communication application 144 sends and receives information to and from electronic communication application 114.

Messaging history 115 includes one or more files that store instant messaging conversations associated with a participant or participants (e.g., user of computing device 110 and user of computing device 140) and a date reference as created by electronic communication application 114. The user of computing device 110 through electronic communication application 114, can later select a previous instance of messaging history 115 associated with at least a participant (i.e., the user may further refine selection with a date). Upon selection of the previous instance of messaging history 115, electronic communication application 114 retrieves and displays the selected previous instance of messaging history 115 that the user may then view and/or restore data within messaging history 115 for utilization by the user. In the depicted embodiment, messaging history 115 resides on computing device 110. In another embodiment, messaging history 115 resides on computing device 140. In some other embodiment, messaging history 115 resides on both computing device 110 and computing device 140. In yet some other embodiment, messaging history 115 resides on another computing device or server connected over network 130 provides messaging history 115 is accessible by electronic communication application 114 (e.g., electronic communication application 144) and collaborative program 200.

Messaging content 116 includes text messages (e.g., conversations) between one or more participants that occur in real-time via an instant messaging feature associated with electronic communication application 114 and electronic communication application 144. For example the users of computing device 110 and computing device 140 send and receive messages via user interfaces 112 and 142 through electronic communication applications 114 and 144 respectively. In an alternate embodiment, messaging content 116 includes voice recordings from a telephone conversation (e.g., teleconference, video conference, etc.), or a combination of voice recordings and text messages. In an example, electronic communication application 114 stores messaging content 116 as an instance of messaging history 115 when a real-time instant messaging conversation is closed, when a user exits electronic communication application 114 that includes instant messaging conversations, and or when ending the recording of a conversation. Collaborative program 200 analyzes messaging content 116 for keywords within the real-time text messages and/or voice data for associated participants for utilization in creating the multi-dimensional cube. In the depicted embodiment, messaging content 116 resides on computing device 110. In another embodiment, messaging content 116 resides on computing device 140. In some other embodiment, messaging content 116 resides on both computing device 110 and computing device 140. In yet some other embodiment, messaging content resides on another computing device or server provided messaging content 116 is accessible by electronic communication application 114 and collaborative program 200.

E-mail files 118 are digital messages exchanged between an author and one or more recipients (e.g., user of computing device 110 and user of computing device 140). E-mail files 118 may be associated with an e-mail thread. The e-mail thread is an e-mail message that includes a running list of all succeeding e-mail replies starting with the original email. The e-mail replies are arranged in a hierarchical structure (e.g., top to bottom, bottom to top, etc.) generally in a chronological order from the first reply to the most recent reply. E-mail files 118 include a message header and message body. The message header of an e-mail includes at least an e-mail address of the author (e.g., From), a date (i.e., local time and date the e-mail was written), a message-ID (i.e., unique identifier for a digital message), in-reply-to: message-ID (e.g., links related messages) and may also include primary recipients (e.g., To), secondary recipients subject through blind carbon copy (BCC) and/or carbon copy (CC), content type, precedence, references (e.g., message-ID and message-ID chain), reply-to (e.g., address to use in a reply), sender (e.g., address of actual sender), and achieved-at (i.e., direct link to the achieved form of an individual e-mail message). The message body of an e-mail includes the data associated with the message. In the depicted embodiment, e-mail files 118 reside on computing device 110. In another embodiment, e-mail files 118 reside on computing device 140. In some other embodiment, e-mail files 118 resides on both computing device 110 and computing device 140. In yet some other embodiment, e-mail files 118 resides on another computing device or server connected over network 130 provided e-mail files 118 are accessible by electronic communication application 114 (e.g., electronic communication application 144) and collaborative program 200.

Results 119 identify relevant e-mail threads and/or portions and/or instances of messaging history 115 to the user for utilization. Results 119 are the output of collaborative program 200, utilizing a multi-dimensional cube analysis that correlates the collaboration participants of an instant messaging conversation, e-mail files 118, and messaging history 115, over time and based on keywords from messaging content 116. Determination of results 119, by collaborative program 200 through the multi-dimensional cube, are depicted and described in greater detail with respect to FIG. 3 and within the examples of FIG. 4A and FIG. 4B. In the depicted embodiment, results 119 reside on computing device 110. In another embodiment, results 119 reside on computing device 140. In another embodiment, results 119 reside on both computing device 110 and computing device 140 (e.g., both computing device 110 and computing device 140 include an instance of collaborative program 200.) In some other embodiment, results 119 may reside on another computing device or server not shown provided results 119 are accessible by collaborative program 200.

Network 130 may be a local area network (LAN), a wide area network (WAN) such as the Internet, a wireless local area network (WLAN), any combination thereof, or any combination of connections and protocols that will support communications between computing device 110, computing device 140, and other computing devices and servers (not shown), in accordance with embodiments of the inventions. Network 130 may include wired, wireless, or fiber optic connections.

Collaborative program 200 is a program that correlates the participants engaged in a collaborative work effort (e.g., teleconference, video conference, instant messaging conversation, etc.) with e-mail files 118 and messaging history 115 with respect to time, and based on keywords from messaging content 116. A collaborative work environment is the process of two or more users communicating and/or working together to realize shared goals (e.g., two users communicating through an instant messaging application represent a joint effort, collaboration, collaborative work environment, etc.). Based on the correlation, collaborative program 200 provides results 119 (e.g., related instances of e-mail files 118, portions and/or instances of messaging history 115, etc.) to the user for further use. In some embodiments, collaborative program 200 adjusts relevant instances of results 119, as collaborative program 200 identifies selections relative to the keywords identified within messaging content 116. In another embodiment, collaborative program 200 determines messaging content 116 includes new keywords that are not related to the current keywords. Collaborative program 200 provides a new instance of results 119 that are associated with the new keywords to the user for utilization. In the depicted embodiment, collaborative program 200 resides on computing device 110. In another embodiment, collaborative program 200 resides on computing device 140. In some other embodiment, collaborative program 200 resides on both computing device 110 and computing device 140. In yet some other embodiment, collaborative program 200 resides on another computing device or server not shown provided collaborative program 200 has access to electronic communication application 114, messaging history 115, messaging content 116, and e-mail files 118.

Figure 2:
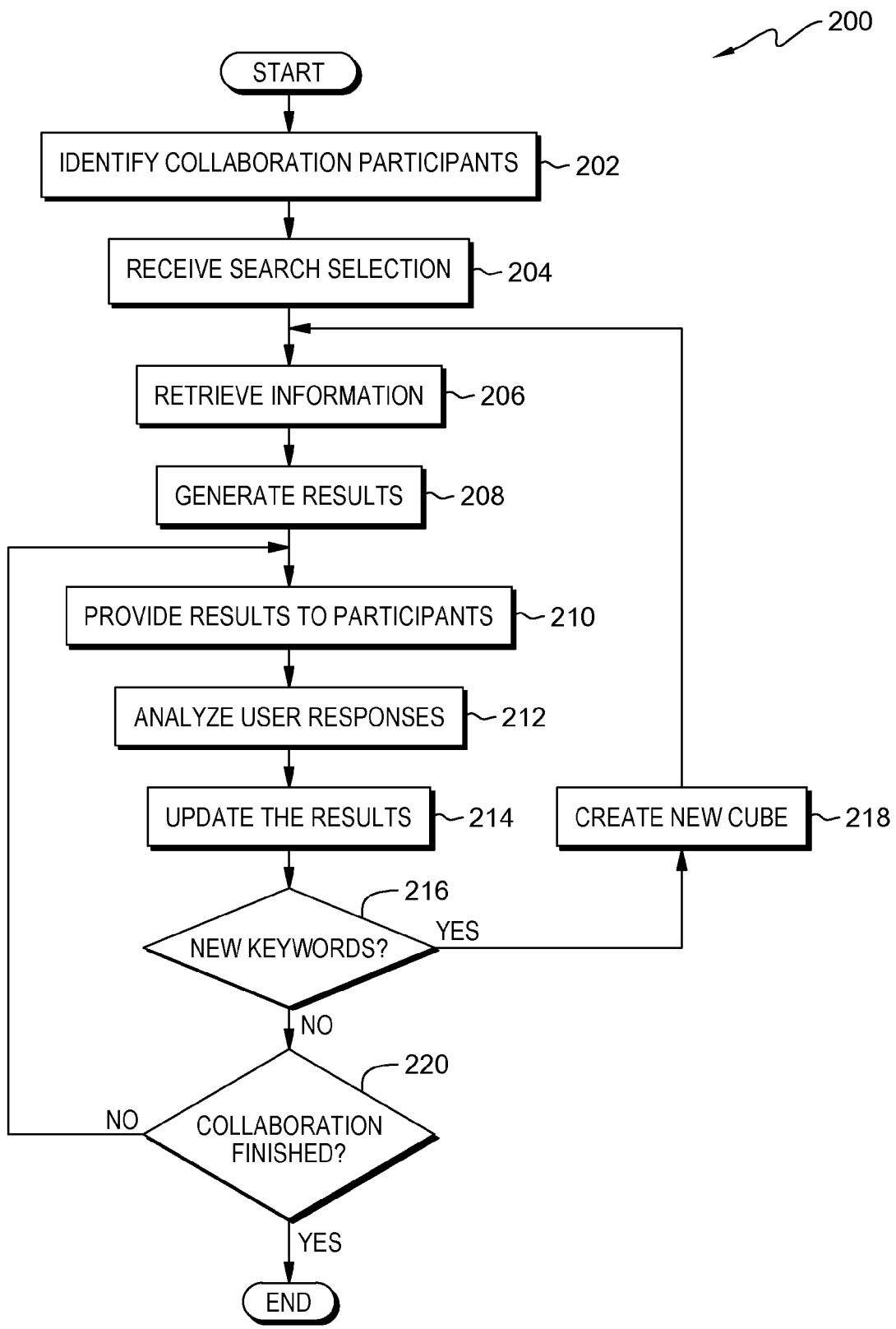
FIG. 2 is a flowchart depicting operational steps of a collaborative program, on a computing device within the electronic communications environment of FIG. 1, for correlating e-mail files with instant messaging conversations to recall prior discussions, in accordance with an embodiment of the present invention.

FIG. 2 is a flowchart depicting operational steps of collaborative program 200, a program for correlating e-mail threads with instant messaging conversations to recall prior discussions, in accordance with an embodiment of the present invention. Prior to initiating, the instant messaging application is associated with an e-mail box (e.g., electronic communication application 114 that includes an instant messaging function in addition to the e-mail client). In one embodiment, collaborative program 200 is embedded within electronic communication application 114. In another embodiment, collaborative program 200 is a standalone program that accesses electronic communication application 114. In another embodiment, collaborative program 200 initiates as a part of electronic communication application 114 (e.g., operates as an available function that runs in the background). In some other embodiments, collaborative program 200 initiates in response to initiating an instant messaging conversation between the user of computing device 110 and the user of computing device 140 (e.g., collaboration between two users). In yet another embodiment, collaborative program 200 initiates in response to a selection made by the user of computing device 110 via user interface 112 (e.g., selects to initiate a search by topic, e-mail thread, recipients, senders, etc.). Multiple instances of collaborative program 200 may occur concurrently or initiate at any point within the identified steps. For example, each time an instant messaging conversation initiates, a corresponding instance of collaborative program 200 may also initiate. Additionally instances of collaborative program 200 may end at any point, in response to a user closing an instant messaging conversation. Upon initiating, collaborative program 200 begins collection of messaging content 116 for future use.

In step 202, collaborative program 200 identifies collaboration participants. In one embodiment, collaborative program 200 identifies two participants associated with an instant messaging conversation initiated by electronic communication application 114 to electronic communication application 144. For example the user of computing device 110 initiates an instant messaging conversation with the user of computing device 140 by selecting the user of computing device 140 through a contact list (e.g., buddy list, friend list, etc.) via user interface 112. Collaborative program 200 identifies the user of computing device 110 and the user of computing device 140 as the collaboration participants. The contact list is a collection of user names (e.g., screen name, login name, nickname, handle, etc.) in an instant messaging, e-mail program, online game, or mobile phone. The user name is the identifier associated with a user of a computer or network service that associates the user with a user account. Identity correlation reconciles and validates proper ownership of disparate user account user names that reside on systems and applications, and can link ownership of the user account user names to the individual by assigning a unique identifier (i.e., primary or common keys) to all validated account user names. Additionally, in general the user name relates to the local portion of an e-mail address, which identifies the e-mail box associated with the user and the associated user account. Collaborative program 200 stores the identified collaboration participants for further utilization. For example, collaborative program 200 stores the identified active collaboration participants within a list.

In another embodiment, collaborative program 200 identifies more than two participants associated with an instant messaging conversation (e.g., chat) initiated through electronic communication application 114 (e.g., invites additional users to join the instant messaging conversation) in a manner similar to the instant messaging conversation between two participants. In general, instant messaging is suited for one-on-one communication, but messages can be sent to more than one person at a time (e.g., chat). A chat often occurs in a chat room which includes multiple different users (e.g., participants). In a chat room, users enter by invite to a closed chat or by logging into an open forum. Upon entering the chat room, users are able to share information with a group of users (e.g., participants) that are also in the chat room. The participants involved in the chat room can exit the chat room at any time without effecting the remaining participants (e.g., messaging continues between the remaining participants). For example, Bob initiates a chat with Sarah and Mary from a contact list associated with electronic communication application 114. Electronic communication application 114 sends an invitation to Sarah and Mary to enter a chat room and collaborative program 200 receives notification of the invitations. As Bob initiated the chat, collaborative program 200 identifies Bob as a collaboration participant at the initiation of the chat room (e.g., automatically enters into the chat room as the host). Collaborative program 200 identifies additional collaboration participants as Mary and Sarah when Mary and Sarah accept the invitations and enter the chat room. Collaborative program 200 stores the identified collaboration participants for further utilization.

In some other embodiment, collaborative program 200 identifies two or more participants associated with a teleconference or video conference. For example, an instance of electronic communication applications 114 and 144 are applications that provide instant messaging, video chat and/or voice call services. Participants register a unique name within electronic communication applications 114 and 144 and are included within a directory. Voice chat allows telephone calls between pairs of users (e.g., participants) and conference calling via a proprietary audio codec (i.e., encodes a data stream for transmission, storage or encryption, or decodes the data stream for playback or editing). Additionally, registered participants receive and initiate calls on computing devices 110 and 140 with conventional phone subscribers through electronic communication applications 114 and 144 (e.g., online number associated with registered participants and conventional phone numbers). In one embodiment, collaborative program 200 identifies the users based upon the registered participant information similarly to a contact list (e.g., both participants are registered users) from electronic communication applications 114 and 144. In another embodiment, collaborative program 200 identifies the collaboration participants based upon the conventional phone number and online number associated with a caller and participant. In some other embodiments, collaborative program 200 identifies the collaboration participants based on voice recognition software. For example, two or more participants may be sharing a microphone (e.g., speaker phone, computing device 140, etc.), but the call (e.g., video conference) originates from a single number. Collaborative program 200 utilizes voice recognition software to identify speakers based on voice characteristics and/or through an analysis of spoken words (e.g., users provide names for the record and/or through initial greetings). In yet another embodiment, collaborative program 200 identifies collaboration participants based on a combination of the aforementioned methods. Collaborative program 200 stores the identified collaboration participants for further utilization.

In step 204, collaborative program 200 receives a search selection. In one embodiment, collaborative program 200 receives a selection to search within e-mail associated with electronic communication application 114. For example, the user of computing device 110 selected a drop down menu within "tools" of the instant messaging window and selects the option to "search in e-mail." Collaborative program 200 provides the user with additional search criteria (e.g., search by name, search by topic, search by other, custom search, etc.). In one embodiment, collaborative program 200 receives a selection from the user via user interface 112 associated with a search by name. In one embodiment, collaborative program 200 provides a list of names of the identified collaboration participants to the user of computing device 110 and receives a selection of one or more identified collaboration participants from the list. In another embodiment, collaborative program automatically selects the identified collaboration participants involved in the instant messaging conversation, chat room, and/or teleconference for the search. In another embodiment, collaborative program 200 receives a selection of a user not involved in the instant messaging conversation/and or chat room to utilize in the search. For example, an invitee did not enter the chat room, but the user of computing device 110 includes the user as an additional participant for collaborative program 200 to utilize in the search. In some other embodiments, collaborative program 200 utilizes a combination of identified collaboration participants (e.g., actively participating via electronic communication applications 114 and 144) and unidentified user(s) (e.g., user is offline).

In another embodiment, collaborative program 200 receives a search selection to search by topic. In one embodiment, collaborative program 200 receives keywords (e.g., single keyword, multiple keywords, phrase, etc.) from the user of computing device 110. In one embodiment, collaborative program 200 receives keywords from the user of computing device 110 from within the instant messaging conversation. For example, the user highlights, copies, and/or circles text within the instant messaging window via user interface 112. Collaborative program 200 receives the selection and stores the words associated with the selection as the keywords for the search. In another embodiment, collaborative program 200 receives keywords as a direct entry from the user of computing device 110 through user interface 112 (e.g., search window, text input box, etc.). For example, the user manually types the keywords into a search box.

In another embodiment, collaborative program 200 automatically receives a search as collaborative program 200 identifies keywords within messaging content 116. Collaborative program 200 identifies words within messaging content 116 (e.g., text strings and/or spoken words identified by speech recognition software, etc.) automatically without input from the user. Collaborative program 200 removes common words from messaging content 116 based on a dictionary and/or set of dictionaries and maintains the non-common words as the keywords for the search. Collaborative program 200 determines a frequency of occurrence for each non-common word (e.g., a word count that represents the number of instances each non-common word occurs). Collaborative program 200 ranks each non-common word based on the frequency of occurrence (e.g., highest frequency of occurrence to lowest frequency of occurrence). Collaborative program 200 identifies the keywords as the non-common words that include a word count (e.g., frequency of occurrence) that meets and/or exceeds a predefined threshold. In one embodiment, collaborative program 200 identifies the keywords that meet and/or exceed a predefined threshold associated with a specified minimum number of occurrences. For example, collaborative program 200 identifies a keyword as a non-common word with a word count of 30, which exceeds the minimum predefined threshold word count of 20. In one embodiment, collaborative program 200 identifies the keywords that meet and/or exceed a predefined threshold associated with a specified predefined threshold percentage of the total number of words (e.g., selects the ranked non-common keywords that meet and/or exceed the predefined threshold). Collaborative program 200 identifies the key word by calculating the percentage of occurrence associated with each instance of a non-common word. For example, a non-common word is associated with a word count of 30 and collaborative program 200 identifies 150 total words overall within messaging content 116. Collaborative program 200 calculates the percentage of occurrence of the non-common word to be 20 percent (e.g., word count of 30 divided by 150 total number of words), which meets and/or exceeds the percentage threshold of fifteen percent.

In some other embodiments, collaborative program 200 receives a search selection through a user selecting keywords from a list of keywords identified by collaborative program 200. Collaborative program 200 identifies multiple keywords that meet and/or exceed the predefined threshold. Additionally collaborative program determines the identified number of keywords exceeds the number of keywords allowed in the search. Collaborative program 200 provides the list of identified keywords to the user for selection. For example, collaborative program 200 identifies thirty words that meet and or exceed the predefined threshold. Collaborative program 200 provides the thirty words to the user of computing device 110 from which the user makes a selection (e.g., one keyword, maximum allowable number of keywords, subset of the keywords, etc.).

As collaborative program 200 progresses, collaborative program 200 continues to record, analyze, and identify additional keywords within messaging content 116 for further use. For example, as a telephone call or instant messaging conversation continues in real-time, and therefore, collaborative program 200 receives additional voice data and/or test messages (e.g., text strings) as the voice data and/or instant messages occur. Collaborative program 200 adds (e.g., appends) the new data (e.g., voice data, text strings) to messaging content 116. In one embodiment, collaborative program 200 updates the keywords in real time as collaborative program 200 receives the additional new data. In another embodiment, collaborative program 200 updates the keywords after collaborative program 200 identifies a new instant message is sent (e.g., text of instant message was not previously included and/or analyzed) and/or identifies a new voice begins speaking (e.g., identifies a change in the identity of the speaker). In some other embodiment, collaborative program 200 updates the keywords at a set time interval (e.g., every minute, every five minutes). In yet some other embodiments, collaborative program 200 initiates an update to the keywords in response to collaborative program 200 identifying a change in the participants communicating in electronic communications environment 100 (e.g., new participant enters and/or exits the conversation and/or chat).

In step 206, collaborative program 200 retrieves information. Collaborative program 200 connects to the e-mail box associated with the user of computing device 110. In one embodiment, collaborative program 200 identifies e-mail files 118 associated with the collaboration participant or participants(s) of the instant messaging conversation and/or chat room. In another embodiment, collaborative program 200 searches the e-mail box for instances of e-mail files 118 associated with the selected one or more participants. In one embodiment, collaborative program 200 retrieves all of the instances of e-mail files 118 (e.g., e-mail threads) that are sent by and/or sent to the selected name. In another embodiment, collaborative program 200 retrieves all of the instances of e-mail files 118 that are sent by and/or sent to the selected name within categories based on the header fields associated with "To," "From", "BCC," and "CC." In some other embodiments, collaborative program 200 receives a custom selection from the user via user interface 112 within one or more categories, and retrieves the instances of e-mail files 118 within the one or more categories.

In another embodiment, collaborative program 200 searches within the subject lines and/or message bodies associated with the identified collaboration participants (step 202) to identify a subset of e-mail files 118 for retrieval based on the identified keywords. For example, collaborative program 200 identifies thirty instances of e-mail files 118 associated with an identified participant. Collaborative program 200 searches within the subject line and message body of the thirty instances of e-mail files 118 for the identified keywords. Collaborative program 200 identifies ten of the thirty instances of e-mail files 118 include the keywords. In some other embodiments, collaborative program 200 searches within the subject lines and/or message bodies within the e-mail box for the identified keywords to identify instances of e-mail files 118. For example, collaborative program 200 identifies and retrieves e-mail files 118 associated with the keywords which may include instances of e-mail files 118 from additional users that are not identified as collaboration participants in addition to the instances of e-mail files 118 associated with the identified collaboration participants.

In some other embodiment, collaborative program 200 retrieves information from messaging history 115. In one embodiment, collaborative program 200 searches within messaging history 115 associated with the identified collaboration participants for the keywords. In another embodiment, collaborative program 200 searches within messaging history 115 utilizing the keywords without including the identified collaboration participants. Collaborative program 200 retrieves the information associated with the identified keywords within the messaging history 115 with respect to identified collaboration participants and/or unidentified collaboration participants. For example, a chat occurs between Mary and John. Collaborative program 200 searches within messaging history 115 for instances of messaging history 115 between Mary and John that include the identified keywords. Julie is a part of the same team as Mary and John, but is not currently online and/or participating in the chat. Collaborative program 200 searches messaging history 115 based on the keywords without specifying identified collaboration participants (e.g., allows performance of a broader search). Collaborative program 200 identifies instances of messaging history 115 between Mary and Julie that also include the keywords. Collaborative program 200 retrieves the additional information for analysis.

Figure 3:
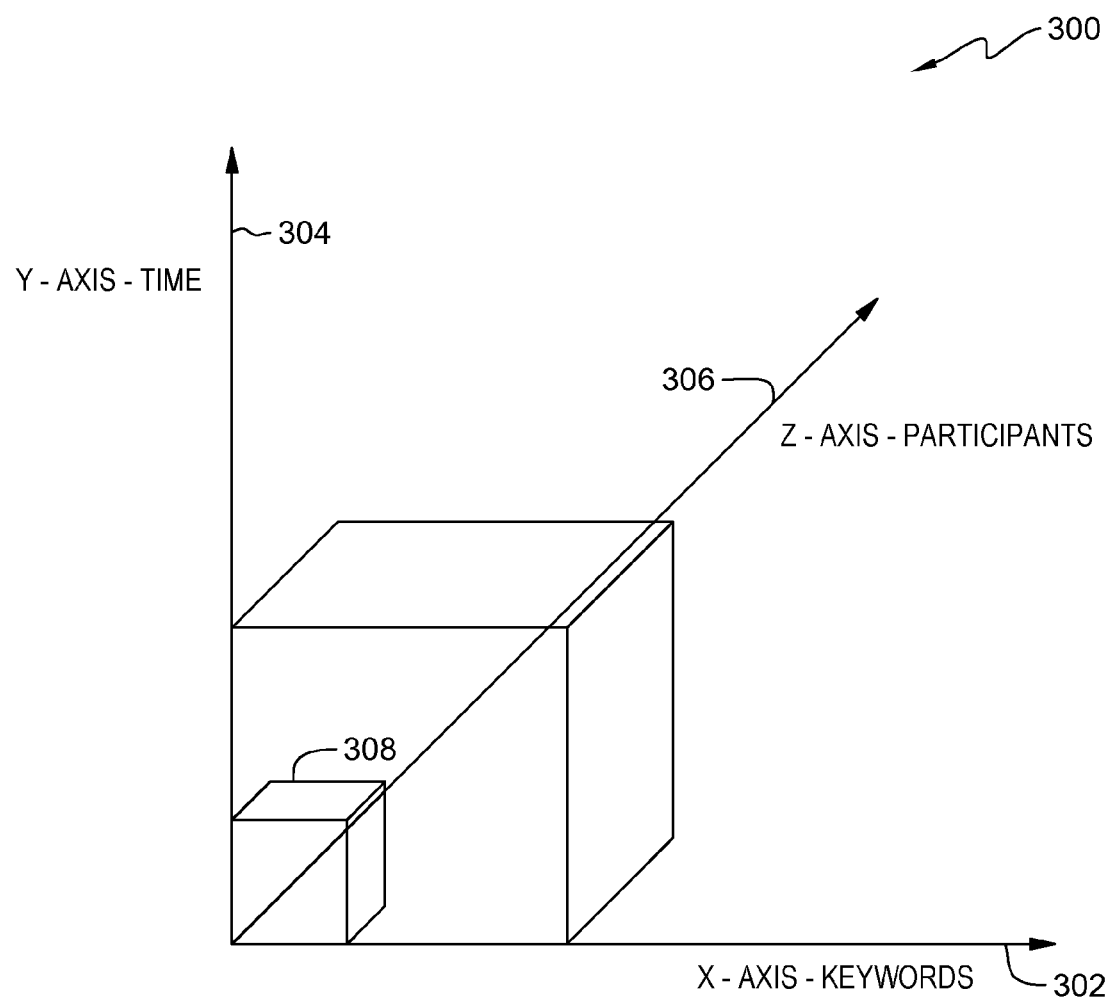
FIG. 3 depicts a multi-dimension cube created by the collaborative program, on the computing device within the electronic communications environment of FIG. 1, that correlates keywords from an instant messaging conversation and instant messaging conversation participants with respect to time to organize historical collaboration data, in accordance with an embodiment of the present invention.

In step 208, collaborative program 200 generates results 119 through multi-dimensional cube 300 as depicted in FIG. 3. Multi-dimensional cube 300 includes x-axis 302 associated with identified keywords, y-axis 304 associated with a time frame, and z-axis 306 associated with collaborative participants, and data unit 308. X-axis 302 is based on the number of occurrences of identified keywords from messaging content 116, with the highest frequently occurring words closest to the origin (e.g., higher relevance associated with keywords near the origin, than words further from the origin). Y-axis 304 is based on the time frame (e.g., time and/or date, range of dates, etc.) associated with messaging history 115 as related to the occurrences of the identified keywords, with the newest or most recent time frame closest to the origin and oldest time furthest from the origin. For example, the date and time associated with the occurrences of the identified keywords associated with yesterday, are closest to the origin, followed by week, then month, etc. Z-axis 306 is based on at least the identified participants associated with electronic communication applications 114 and 144. In some embodiments, Z-axis 306 may also include users associated with instances of e-mail files 118 and of messaging history 115 that collaborative program 200 identifies during the search for the identified keywords within the e-mail box associated with electronic communication application 114 and/or messaging history 115. Collaborative program 200 places the participants of the instant messaging application closest to the origin, followed by identified users from the e-mail box and messaging history further out on the z-axis. The more involved in the collaboration, the closer collaborative program 200 places the participant and/or identified user to the origin. In general, collaborative program 200 places the more relevant information closest to the origin on each axis. Data unit 308 includes: links to e-mail files 118 and/or messaging history 115 at specific x, y, and z points, attributes of x, y, and z, and actions that enable operation to access results 119 (e.g., collaborative data). For example each instance of e-mail files 118 and messaging history 115 are associated with a corresponding x, y, and z coordinate that places the instance of e-mail files 118 and messaging history 115 within results 119. At any time when viewing results 119, the user may select and/or re-select the x, y, and z coordinate (e.g., data point) and collaborative program 200 retrieves the associated instance e-mail files 118 and/or instance of messaging history 115 within results 119 that corresponds to the data point for viewing by the user.

Collaborative program 200 selects a predefined number of keywords from the identified keywords to represent the current topic. For example, collaborative program 200 selects the three highest frequency of occurrence keywords identified within messaging content 116. Collaborative program 200 creates the x-axis based on the three keywords, with the three highest frequency word closest to the origin (e.g., highest frequency of occurrence closest to the origin, remaining keywords follow in descending order to the lowest frequency of occurrence). Collaborative program 200 retrieves the time frame associated with each instance of the three keywords from within the search results associated with e-mail files 118 and messaging history 115. Collaborative program 200 populates the y-axis with the known dates and or times associated with the three keywords. Additionally collaborative program 200 retrieves the participant data associated with the keywords and sets up the z-axis and data points with the corresponding participant information to complete generation of the cube which provides results 119. For example, in the initial phase of cube generation, collaborative program 200 creates two dimensional cube 400, wherein the x axis is defined by the identified keywords: resolution, fixes, and issues and the y-axis is defined by the associated time frames of day, week, and month. Collaborative program 200 adds participant information into a Z-axis (not shown) and links the instance of e-mail files 118 and/or messaging history 115 that corresponds to the location identified by the specified x, y, z, coordinates. Each x, y, z, data point (e.g., coordinate) links to a specific instance of e-mail files 118 and/or messaging history 115 that a user may then select from to view the relevant information.

In step 210, collaborative program 200 provides results 119 to the user. In one embodiment, collaborative program 200 provides results 119 as a multi-dimensional cube to the user. In one embodiment, collaborative program 200 identifies selectable data points to the user within the multi-dimensional cube (e.g., marks most relevant data points in the analysis) with the keywords, time frame, and participant information. In another embodiment, collaborative program 200 provides information relative to a data point within the multi-dimensional cube as the user moves a mouse over the multi-dimensional cube (e.g., hovering over a data point displays the keywords, time frame, and participant information). In another embodiment, collaborative program 200 provides results 119 to the user as a list. Collaborative program 200 ranks e-mail files 118 and/or instance of messaging history 115 based on location with the multi-dimensional cube, ranking e-mail files 118 from nearest to farthest in order of location to the origin (e.g., e-mail files 118 that occur most recent are closest to the origin, e-mail files 118 that occur further in the part are farther from the origin). For example, collaborative program 200 identifies five instances of e-mail files 118 based on the keywords, time (e.g., date), and participants. Collaborative program 200 ranks the instance of e-mail files 118 closest to the origin as first, and the instance of e-mail files 118 furthest from the origin as fifth. In one embodiment, collaborative program 200 provides all instances of results 119 as ranked list. In another embodiment, collaborative program 200 provides a subset of results 119 (e.g., top ten instances, from a single participant, selected time frame, specific keyword, etc.)

In step 212, collaborative program 200 analyses user responses. Collaborative program 200 stores selections made by the user from results 119. Collaborative program 200 records the manner in which the user selects results 119. In one embodiment, collaborative program 200 records the user selects results 119 from the identified points within the multi-dimensional cube and/or ranked list of results (e.g., utilizes provided results 119 that are closest to the origin). For example, the user selects the highest ranked instance of results 119 within the list which is closest to the origin. In another embodiment, collaborative program 200 records the user selects results 119 that were not specified and/or included within the ranked list of results 119 (e.g., utilizes results 119 further from the origin and/or not specified within highest ranked instances of results 119). For example, the user views the multi-dimensional cube, and selects an instance of results 119 after hovering over data points and reading the keywords, time frame, and participant information. After collaborative program 200 identifies the user makes a selection from results 119, collaborative program 200 records additional information relative to the selection. Collaborative program 200 records the amount of time a user spends reviewing the selected instance of results 119 (e.g., less than a minute, five minutes, ten minutes, etc.) For example, collaborative program 200 determines the longer the user views an instance of results 119, the greater the importance, and therefore, collaborative program 200 assigns a higher weight to the selected instance of results 119. Conversely, collaborative program 200 determines the less time the user spends viewing an instance of results 119, the less important the instance of results 119 is to the user, and therefore, collaborative program 200 assigns a lower weight to the selected instance of results 119. Collaborative program 200 records actions (e.g., like, ignore, close, minimize, etc.) associated with the selected instance of results 119. For example, the user may select to view some instances of results 119 and ignore (e.g., close, delete, etc.) other instances of results 119. Collaborative program 200 associates a weight with each action. For example, a collaborative program 200 assigns a higher weight to "liked" instances of results 119, and a lower weight to "ignored", "minimized," and "closed," instances of results 119.

In some other embodiment, collaborative program 200 determines the number of instances associated with the user selection within results 119 associated with each aspects of the data point values (e.g., keyword, time frame, or participant). Collaborative program 200 determines a user preference based on the number of instances associated with each of the possible data point types: keyword, time frame, and participant, associated with the selection (e.g., highest number of instances of selection indicates a preference). For example, the user may select instances of results 119 by keyword more often than selections by participant, indicating a higher priority with information related to keywords, than information associated with a specific participant that does not include the keyword. Additionally, collaborative program 200 identifies aspects of selection of instances of results 119 relative to the relationship with the identified keywords, time frame, and/or participants which define the x, y, and z axes. For example, the user may select a keyword that is not included within the keywords that define the x-axis and/or are nearest to the origin. Collaborative program 200 determines the number of times the user selects the unidentified keyword in order to determine adjustments to results 119. Collaborative program 200 determines a weight and/or adjustment associated with each axis associated with the x, y, and z data points based on an analysis of the user responses for further utilization.

In some other embodiment, collaborative program 200 identifies a user response by the user marking an instance of results 119 with respect to the current topic and/or a new topic. When the user views results 119, the user, through user interface 112, can mark (e.g., flag) an instance of e-mail files 118 (e.g., e-mail thread) and/or instances of messaging history 115 within results 119 with a "to end" mark or a "custom" mark. Instances of e-mail files 118 and/or instances of messaging history 115 within results 119 that include an indication of "to end" to represent that the instance of e-mail files 118 and/or messaging history 115 prior to, and including the "to end" mark are related to the current topic. Collaborative program 200 identifies instances of e-mail files 118 after the "to end" mark as being related to a new topic. Instances of e-mail files 118 and/or instances of messaging history 115 within results 119 that include an indication of associated with custom indicate that the instance of e-mail files 118 and/or instance of messaging history 115 are the most relevant to the current topic. Collaborative program 200 stores the identified marks with the associated data which can be viewed at any time. For example, a user closes results 119 at the end of the day. The next morning, the user re-opens results 119 to review the information, and collaborative program 200 displays results 199 with the previously assigned marks.

In step 214, collaborative program 200 updates results 119. Collaborative program 200 applies the determined weights and/or adjustments from based on step 212. In one embodiment, collaborative program 200 applies weights to the data points associated with the x, y, and z axes. For example, the user selects results 119 based on: keywords twenty times, time frame five times, and by participant thirteen times. Collaborative program 200 increases the weight associated with the x-axis (e.g., keywords) higher, increases the weight associated with the z-axis (e.g., participants) to be higher but less than the weight associated with the x-axis, and decreases the weight associated with the y-axis (e.g., time frame). Collaborative program 200 adjusts each of the three data point values: keywords, time frame, and participant that correspond with the changes in each respective axis. By adjusting the weights of the x, y, and z axes, collaborative program 200 changes the position of the data points associated with individual instances of results 119 within the multi-dimensional cube. Therefore, results 119 associated with the keywords and participants are moved closer to the origin, whereas results 119 associated with the time frame are moved further from the origin. In another embodiment, collaborative program 200 moves results 119 closer or further away from the origin based on the analysis of the selection. For example, a keyword of water is selected twenty times, but the keywords closest to the origin are earth, wind, and fire. The frequency of occurrence associated with: earth is thirty, wind is twenty-five, and fire is eighteen. Collaborative program 200 moves the data point associated with water closer to the origin between wind and fire. Collaborative program 200 updates the structure of the multi-dimensional cube to correspond to the changes that results from the weights and/or adjustments. In another embodiment, collaborative program 200 updates the results to correspond to the set mark within results 119 (e.g., moves the marked instance closer to the origin, no longer shows instances of results 119 that occur after the "to end" mark.)

In decision 216, collaborative program 200 determines whether new keywords are included within messaging content 116. Collaborative program 200 initially identifies new keywords, to be words that are included within messaging content 116 that do not match previously identified keywords and/or are not related to previously identified keywords. Collaborative program 200 determines keywords that include a different tense, plurality and/or a synonym to be related or matching. Collaborative program 200 determines words that do not share a similar meaning and/or are not related through tense and/or plurality to be new keywords. As instant messaging conversations continue, collaborative program 200 analyzes the content of messaging content 116 for changes to the keywords. In one embodiment, collaborative program 200 identifies the "to end" mark, indicating the current topic is complete and a switch to a new topic. Collaborative program 200 determines new keywords from messaging content 116 that occur after the "to end" mark.

Figure 4A:
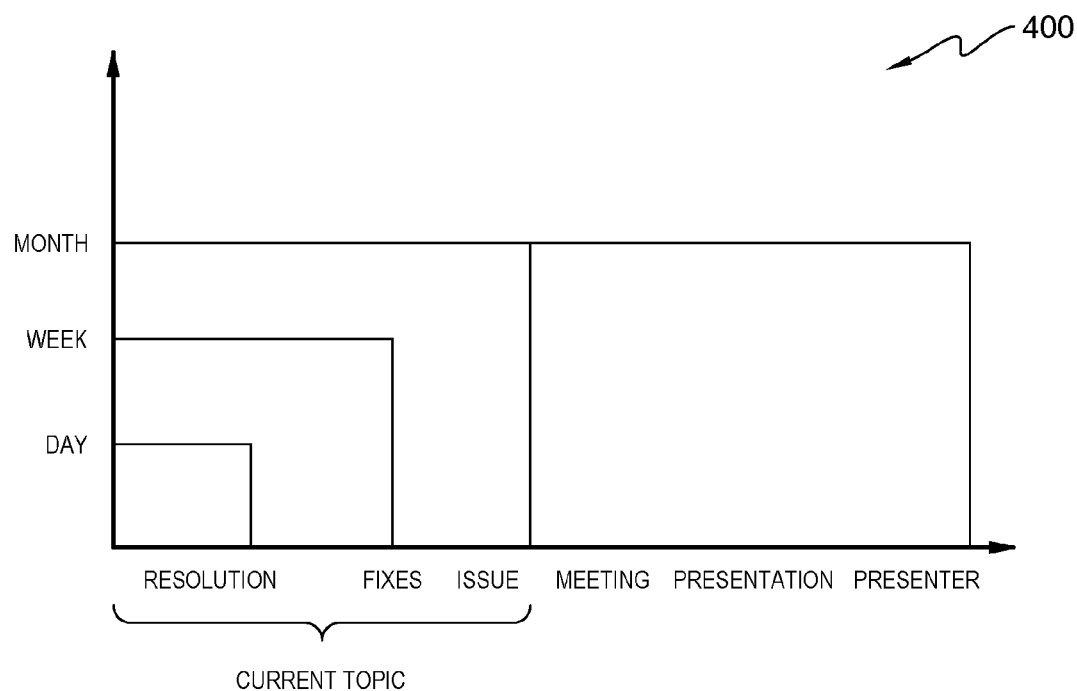
FIG. 4A depicts an initially created cube associated with a current topic, in accordance with an embodiment of the present invention.

In another embodiment, collaborative program 200 determines the frequency of occurrence of the keywords and a relatedness factor that identifies how often the keywords occur together. Collaborative program 200 compares the frequency of occurrence of newly identified keywords with the previously identified keywords. Collaborative program 200 determines new keywords are included in messaging content when the frequency of occurrence of the new words exceeds the frequency of occurrence of the previously identified keywords. For example, instant messaging conversations occur via electronic communication applications 114 and 144 throughout the day. As depicted in FIG. 4A, collaborative program 200 initially identifies the keywords within messaging content 116 of "resolutions," "fixes," and "issue" as the most frequently occurring keywords, which represent the current topic. The keywords associated with the current topic are followed by "meeting," "presentation," and "presenter". However, throughout the day, collaborative program 200 determines the instant messaging conversation includes fewer occurrences of the keywords "resolution," "fixes," and "issue" and an increase in the frequency of occurrence of the keywords "meeting, "presentation," and "presenter." Collaborative program 200 determines the frequency of occurrence associated with the keywords of "meeting", "presentation," and "presenter" exceed the frequency of occurrence of "resolutions," "fixes," and "issue". Additionally collaborative program 200 determines "meeting", "presentation," and "presenter" are a topic based on the relatedness (e.g., included within the same text string and/or in response to questions and answers within messaging content 116).

If collaborative program 200 determines new keywords are included within messaging content 116 (decision 216, yes branch), then collaborative program 200 creates a new cube (step 218). If collaborative program 200 determines new keywords are not included within messaging content 116 (decision 216, no branch), then collaborative program 200 determines whether the collaboration is finished (decision 220.) For example, collaborative program 200 determines new keywords are not present in messaging content 116 when the frequency of occurrence of additional keywords are less than the frequency of occurrence of the initially identified keywords in step 204.

Figure 4B:
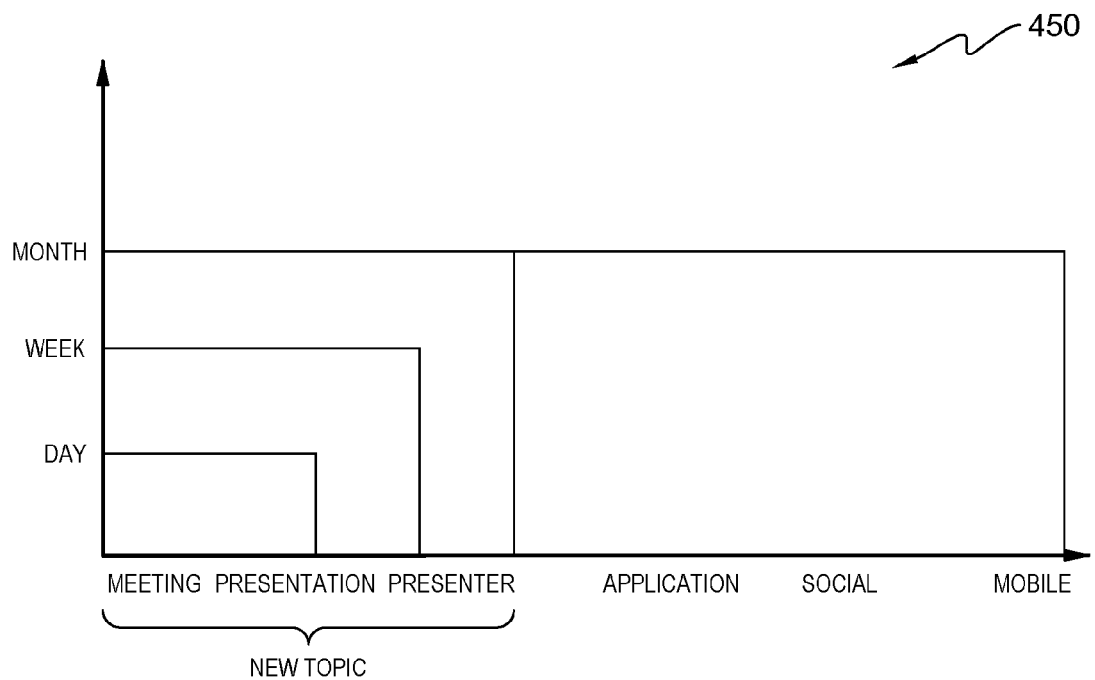
FIG. 4B depicts the generation of a new cube by splitting the initially created cube associated with the current topic, to a new topic based on identifying a change to the keywords, in accordance with an embodiment of the present invention.

In step 218, collaborative program 200 creates a new multi-dimensional cube based on the new keywords (e.g., new instance of results 119). Collaborative program 200 replaces the previously identified keywords with the new keywords. Collaborative program 200 stores the initial instance of results 119 of the multi-dimensional cube for future use. For example, the keywords of "resolutions," "fixes," and "issue" increase in frequency of occurrence and again become the keywords. Collaborative program 200 retrieves the results and includes updates which are then provided to the user. Additionally in another embodiment, the user may select to review results associated with "resolutions," "fixes," and "issue" offline or outside of an instant messaging conversation and selects the stored instance of results 119 associate with "resolutions," "fixes," and "issue." Collaborative program 200 replaces the previously identifies keywords of "resolutions," "fixes," and "issue" with the new identified keywords to be "meeting," "presentation," and "presenter" and initiates the creation of two dimensional cube 450 as depicted in FIG. 4B for the new topic. The keywords of "meeting", "presentation," and "presenter" are closest to the origin indicating the change in topic from the current topic depicted in FIG. 4A to the new topic depicted in FIG. 4B (e.g., splits the initial cube into two cubes with different instances of results 119.) Collaborative program 200 returns to step 206 and retrieves information based on the new keywords in order to create a new instance of results 119.

In decision 220, collaborative program 200 determines whether the collaboration is finished. In one embodiment, collaborative program 200 determines the collaboration is finished when the user closes the instant messaging window associated with the current collaboration. Collaborative program 200 closes the instance of results 119 and ends. As collaborative program 200 may provide multiple instances of results 119 associated with different collaborations, collaborative program 200 only closes the instance of results 119 associated with the specific closed collaboration instance. For example, Harry and Sally are involved in a collaboration with in which collaborative program 200 provides an instance of results 119. In addition Harry and Ted are also involved in a collaboration in with in which collaborative program 200 provides an instance of results 119. Harry closes the collaboration with Sally and collaborative program 200 stores the instance of results 119, but closes the viewing of results 119. However as the collaboration between Harry and Ted continues, collaborative program 200 leaves the instance of results 119 associated with the collaboration between Harry and Ted open. In another embodiment, collaborative program 200 determines the user closes electronic communication application 114, and stores and closes all instances of results 119.

If collaborative program 200 determines the collaboration is finished (decision 220, yes branch), then collaborative program 200 stores and closes results 119, and ends. If collaborative program 200 determines the collaboration is not finished, (decision 220, no branch), then collaborative program 200 provides results 119 to the participants (step 210).

Figure 5:
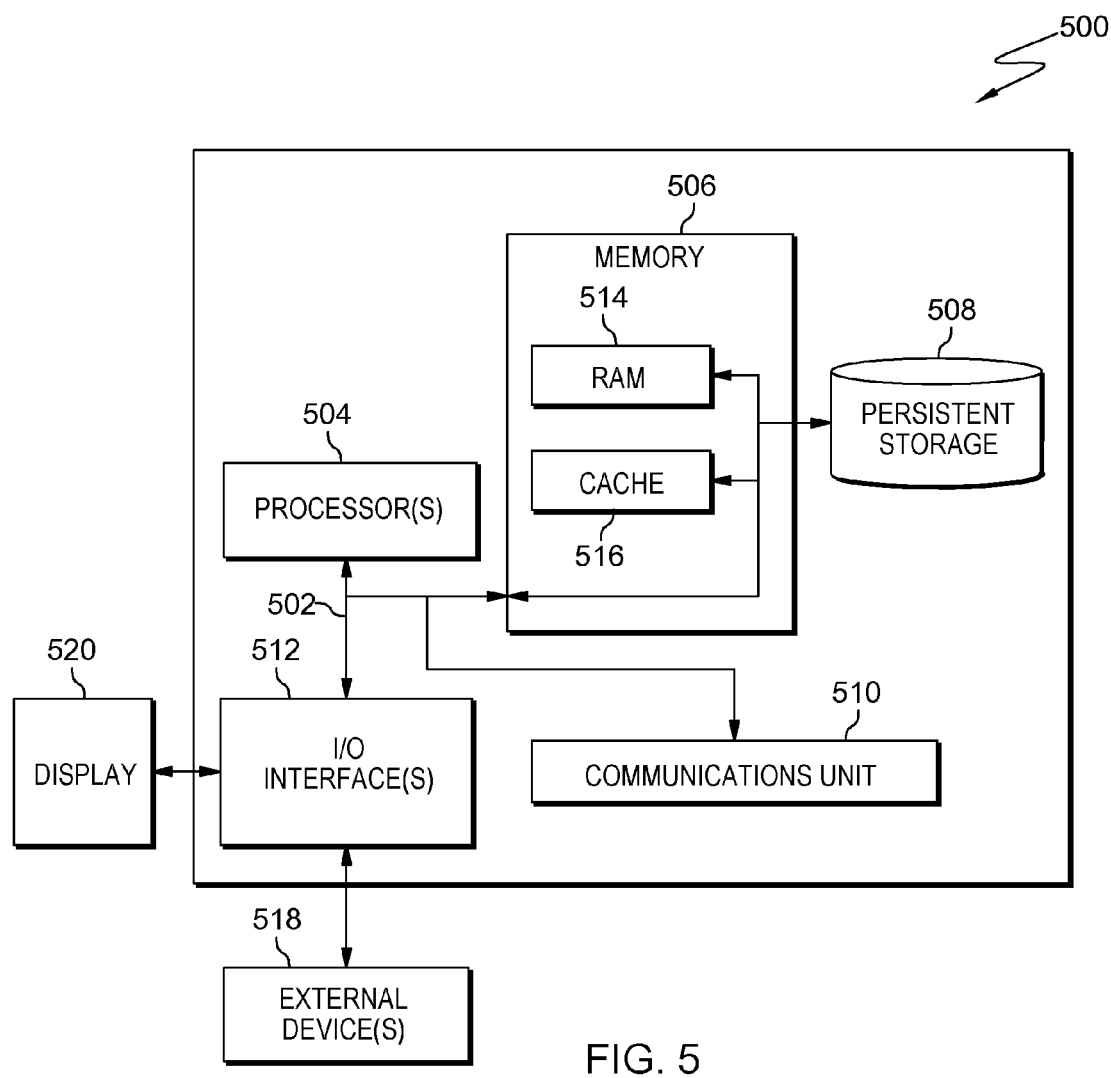
FIG. 5 is a block diagram of components of the computing device executing the collaborative program, in accordance with an embodiment of the present invention.

FIG. 5 depicts a block diagram of components of computing device 500 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM) 514. In general, memory 506 can include any suitable volatile or non-volatile computer readable storage media. Cache 516 is a fast memory that enhances the performance of computer processor(s) 504 by holding recently accessed data, and data near accessed data, from memory 506.

User interface 112, user interface 142, electronic communication application 114, electronic communication application 144, messaging history 115, messaging content 116, e-mail files 118, results 119, and collaborative program 200 may be stored in persistent storage 508 and in memory 506 for execution and/or access by one or more of the respective computer processor(s) 504 via cache 516. In an embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. User interface 112, user interface 142, electronic communication application 114, electronic communication application 144, messaging history 115, messaging content 116, e-mail files 118, results 119, and collaborative program 200 may be downloaded to persistent storage 508 through communications unit 510.

I/O interface(s) 512 allows for input and output of data with other devices that may be connected to computing device 500. For example, I/O interface(s) 512 may provide a connection to external device(s) 518, such as a keyboard, a keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., user interface 112, user interface 142, electronic communication application 114, electronic communication application 144, messaging history 115, messaging content 116, e-mail files 118, results 119, and collaborative program 200, can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for providing historical results related to a collaboration, the method comprising:

identifying, by one or more computer processors, a first participant and a one or more additional participants associated with a collaboration through an electronic communication application that includes messaging content;

identifying, by one or more computer processors, a first set of one or more keywords within the messaging content between the first participant and the one or more additional participants;

retrieving, by one or more computer processors, a first set of historical information based at least in part on the first set of one or more keywords, the first participant and the one or more additional participants, wherein the first set of historical information includes at least one of the following: e-mail files and messaging history;

generating, by one or more computer processors, a first instance of historical results that includes a multi-dimensional cube that graphs the first set of historical information with respect to the first set of one or more keywords, the first participant and the one or more additional participants, and a time frame; and providing, by one or more computer processors, the first instance of historical results to the first participant.

2. The method of claim 1, further comprising:

receiving, by one or more computer processors, one or more responses associated with the first participant within the first instance of historical results wherein the one or more responses includes one or more of a frequency of selection, an action, and a viewing time;

determining, by one or more computer processors, a weight change to the first instance of historical results based on the received one or more responses;

updating, by one or more computer processors, the first instance of historical results based on the determined weight change; and providing, by one or more computer processors, the updated first instance of historical results to the first participant.

3. The method of claim 1, further comprising:

receiving, by one or more computer processors, a mark from the first participant associated with the first instance of historical results wherein the mark includes one of the following: an end mark that identifies the end of a topic and a custom mark that identifies a most relevant result;

updating, by one or more computer processors, the first instance of historical results based on the received mark; and providing, by one or more computer processors, the updated first instance of historical results to the first participant.

4. The method of claim 1, further comprising:

determining, by one or more computer processors, that additional messaging content is added to the messaging content;

identifying, by one or more computer processors, a second set of one or more keywords within the additional messaging content and the messaging content that do not match the first set of one or more keywords;

determining, by one or more computer processors, that second set of one or more keywords occur more frequently than the first set of one or more keywords;

storing, by one or more computer processors, the first set of historical results associated with the first set of one or more keywords;

replacing, by one or more computer processors, the first set of one or more keywords with the second set of one or more keywords;

retrieving, by one or more computer processors, a second set of historical information based at least in part on the second set of one or more keywords;

generating, by one or more computer processors, a second instance of historical results based on the second set of historical information; and providing, by one or more computer processors, the second instance of historical results to the first participant.

5. The method of claim 1, wherein identifying the first set of one or more keywords within a messaging content between the first participant and the one or more additional participants further comprises:

identifying, by one or more computer processors, one or more non-common words within the messaging content based on a dictionary that identifies common words;

calculating, by one or more computer processors, a frequency of occurrence associated with each one of the one or more non-common words;

ranking, by one or more computer processors, the identified one or more non-common words based on the calculated frequency of occurrence associated with each one of the one or more non-common words; and identifying, by one or more computer processors, one or more of the ranked one or more non-common words as the first set of one or more keywords based on one of the following: a selection of one or more of the ranked one or more non-common words by the first participant, and a selection one or more of the ranked one or more non-common words based on a predefined threshold.

6. The method of claim 1, wherein retrieving, a first set of historical information based at least in part on the first set of one or more keywords, the first participant and the one or more additional participants, wherein the first set of historical information includes at least one of the following: e-mail files and messaging history, further comprises one or more of the following:

retrieving, by one or more computer processors, one or more e-mail files associated with one or more of: the first participant, the one or more additional participants, and one or more of the first set of one or more keywords; and retrieving, by one or more computer processors, one or more instances of messaging history associated with one or more of: the first participant, the one or more additional participants, and one or more of the first set of one or more keywords.

7. The method of claim 1, wherein generating the first instance of historical results that includes a multi-dimensional cube that graphs the first set of historical information with respect to the first set of one or more keywords, the first participant and the one or more additional participants, and the time frame further comprises:

assigning, by one or more computer processors, the first set of one or more keywords to an x-axis, wherein the one or more keywords are placed on the x-axis in order from highest frequency of occurrence to lowest frequency of occurrence;

assigning, by one or more computer processor, the first participant and the one or more additional participants to a z-axis, wherein the first participant and the one or more additional participants are placed on the z-axis in order from highest frequency of occurrence to lowest frequency of occurrence;

assigning, by one or more computer processors, the time frame to a y-axis wherein the time frame corresponds to one or more of the following: a date and a time, that is associated with the first set of historical information from a most recent time frame to a least recent time frame;

identifying, by one or more computer processors, one or more keywords, one or more participants, and a time associated with individual instances of historical information within the first set of historical information; and assigning, by one or more computer processors, the individual instances of historical information within the first set of historical information to a corresponding data point associated with the x-axis, the y-axis, and the z-axis based on the identified one or more keywords, one or more participants, and the time frame.

8. A computer program product for providing historical results related to a collaboration, the computer program product comprising:

one or more computer readable storage devices and program instructions stored on the one or more computer readable storage devices, the program instructions comprising:

program instructions to identify a first participant and a one or more additional participants associated with a collaboration through an electronic communication application that includes messaging content;

program instructions to identify a first set of one or more keywords within the messaging content between the first participant and the one or more additional participants;

program instructions to retrieve a first set of historical information based at least in part on the first set of one or more keywords, the first participant and the one or more additional participants, wherein the first set of historical information includes at least one of the following:

e-mail files and messaging history;

program instructions to generate a first instance of historical results that includes a multi-dimensional cube that graphs the first set of historical information with respect to the first set of one or more keywords, the first participant and the one or more additional participants, and a time frame; and program instructions to provide the first instance of historical results to the first participant.

9. The computer program product of claim 8, further comprising program instructions, stored on the one or more computer readable storage devices, to:

receive one or more responses associated with the first participant within the first instance of historical results wherein the one or more responses includes one or more of a frequency of selection, an action, and a viewing time;

determine a weight change to the first instance of historical results based on the received one or more responses;

update the first instance of historical results based on the determined weight change; and provide the updated first instance of historical results to the first participant.

10. The computer program product of claim 8, further comprising program instructions, stored on the one or more computer readable storage devices, to:

receive a mark from the first participant associated with the first instance of historical results wherein the mark includes one of the following: an end mark that identifies the end of a topic and a custom mark that identifies a most relevant result;

update the first instance of historical results based on the received mark; and provide the updated first instance of historical results to the first participant.

11. The computer program product of claim 8, further comprising program instructions, stored on the one or more computer readable storage devices, to:

determine that additional messaging content is added to the messaging content;

identify a second set of one or more keywords within the additional messaging content and the messaging content that do not match the first set of one or more keywords;

determine that second set of one or more keywords occur more frequently than the first set of one or more keywords;

store the first set of historical results associated with the first set of one or more keywords;

replace the first set of one or more keywords with the second set of one or more keywords;

retrieve a second set of historical information based at least in part on the second set of one or more keywords;

generate a second instance of historical results based on the second set of historical information; and provide the second instance of historical results to the first participant.

12. The computer program product of claim 8, wherein to identify the first set of one or more keywords within a messaging content between the first participant and the one or more additional participants further comprises program instructions, stored on the one or more computer readable storage devices, to:

identify one or more non-common words within the messaging content based on a dictionary that identifies common words;

calculate a frequency of occurrence associated with each one of the one or more non-common words;

rank the identified one or more non-common words based on the calculated frequency of occurrence associated with each one of the one or more non-common words; and identify one or more of the ranked one or more non-common words as the first set of one or more keywords based on one of the following: a selection of one or more of the ranked one or more non-common words by the first participant, and a selection one or more of the ranked one or more non-common words based on a predefined threshold.

13. The computer program product of claim 8, wherein to retrieve a first set of historical information based at least in part on the first set of one or more keywords, the first participant and the one or more additional participants, wherein the first set of historical information includes at least one of the following: e-mail files and messaging history, further comprises one or more of the following program instructions, stored on the one or more computer readable storage devices, to:

retrieve one or more e-mail files associated with one or more of: the first participant, the one or more additional participants, and one or more of the first set of one or more keywords; and retrieve one or more instances of messaging history associated with one or more of: the first participant, the one or more additional participants, and one or more of the first set of one or more keywords.

14. The computer program product of claim 8, wherein to generate the first instance of historical results that includes a multi-dimensional cube that graphs the first set of historical information with respect to the first set of one or more keywords, the first participant and the one or more additional participants, and the time frame further comprises program instructions, stored on the one or more computer readable storage devices, to:

assign the first set of one or more keywords to an x-axis, wherein the one or more keywords are placed on the x-axis in order from highest frequency of occurrence to lowest frequency of occurrence;

assign the first participant and the one or more additional participants to a z-axis, wherein the first participant and the one or more additional participants are placed on the z-axis in order from highest frequency of occurrence to lowest frequency of occurrence;

assign the time frame to a y-axis wherein the time frame corresponds to one or more of the following: a date and a time, that is associated with the first set of historical information from a most recent time frame to a least recent time frame;

identify one or more keywords, one or more participants, and a time associated with individual instances of historical information within the first set of historical information; and assign the individual instances of historical information within the first set of historical information to a corresponding data point associated with the x-axis, the y-axis, and the z-axis based on the identified one or more keywords, one or more participants, and the time frame.

15. A computer system for providing historical results related to a collaboration, the computer system comprising:

one or more computer processors, one or more computer readable storage devices, and program instructions stored on the computer readable storage devices for execution by at least one of the one or more processors, the program instructions comprising:

program instructions to identify a first participant and a one or more additional participants associated with a collaboration through an electronic communication application that includes messaging content;

program instructions to identify a first set of one or more keywords within the messaging content between the first participant and the one or more additional participants;

program instructions to retrieve a first set of historical information based at least in part on the first set of one or more keywords, the first participant and the one or more additional participants, wherein the first set of historical information includes at least one of the following:

e-mail files and messaging history;

program instructions to generate a first instance of historical results that includes a multi-dimensional cube that graphs the first set of historical information with respect to the first set of one or more keywords, the first participant and the one or more additional participants, and a time frame; and program instructions to provide the first instance of historical results to the first participant.

16. The computer system of claim 15, further comprising program instructions, stored on the one or more computer readable storage devices, to:

receive one or more responses associated with the first participant within the first instance of historical results wherein the one or more responses includes one or more of a frequency of selection, an action, and a viewing time;

determine a weight change to the first instance of historical results based on the received one or more responses;

update the first instance of historical results based on the determined weight change; and provide the updated first instance of historical results to the first participant.

17. The computer system of claim 15, further comprising program instructions, stored on the one or more computer readable storage devices, to:

receive a mark from the first participant associated with the first instance of historical results wherein the mark includes one of the following: an end mark that identifies the end of a topic and a custom mark that identifies a most relevant result;

update the first instance of historical results based on the received mark; and provide the updated first instance of historical results to the first participant.

18. The computer system of claim 15, further comprising program instructions, stored on the one or more computer readable storage devices, to:

determine that additional messaging content is added to the messaging content;

identify a second set of one or more keywords within the additional messaging content and the messaging content that do not match the first set of one or more keywords;

determine that second set of one or more keywords occur more frequently than the first set of one or more keywords;

store the first set of historical results associated with the first set of one or more keywords;

replace the first set of one or more keywords with the second set of one or more keywords;

retrieve a second set of historical information based at least in part on the second set of one or more keywords;

generate a second instance of historical results based on the second set of historical information; and provide the second instance of historical results to the first participant.

19. The computer system of claim 15, wherein to identify the first set of one or more keywords within a messaging content between the first participant and the one or more additional participants further comprises program instructions, stored on the one or more computer readable storage devices, to:

identify one or more non-common words within the messaging content based on a dictionary that identifies common words;

calculate a frequency of occurrence associated with each one of the one or more non-common words;

rank the identified one or more non-common words based on the calculated frequency of occurrence associated with each one of the one or more non-common words; and identify one or more of the ranked one or more non-common words as the first set of one or more keywords based on one of the following: a selection of one or more of the ranked one or more non-common words by the first participant, and a selection one or more of the ranked one or more non-common words based on a predefined threshold.

20. The computer system of claim 15, wherein to retrieve a first set of historical information based at least in part on the first set of one or more keywords, the first participant and the one or more additional participants, wherein the first set of historical information includes at least one of the following: e-mail files and messaging history, further comprises one or more of the following program instructions, stored on the one or more computer readable storage devices, to:

retrieve one or more e-mail files associated with one or more of: the first participant, the one or more additional participants, and one or more of the first set of one or more keywords; and retrieve one or more instances of messaging history associated with one or more of: the first participant, the one or more additional participants, and one or more of the first set of one or more keywords.

\* \* \* \* \*